(12) United States Patent
Briant et al.

(10) Patent No.: US 9,673,570 B2
(45) Date of Patent: Jun. 6, 2017

(54) STACKED CAGE HAVING DIFFERENT SIZE PORTS

(71) Applicant: TYCO ELECTRONICS CORPORATION, Berwyn, PA (US)

(72) Inventors: Eric David Briant, Dillsburg, PA (US); Nikhil Shankar, Harrisburg, PA (US)

(73) Assignee: TE CONNECTIVITY CORPORATION, Berwyn, PA (US)

( * ) Notice: Subject to any disclaimer, the term of this patent is extended or adjusted under 35 U.S.C. 154(b) by 0 days.

(21) Appl. No.: 14/861,698

(22) Filed: Sep. 22, 2015

(65) Prior Publication Data

US 2017/0085035 A1    Mar. 23, 2017

(51) Int. Cl.
*H01R 13/62* (2006.01)
*H01R 13/659* (2011.01)
*H01R 13/66* (2006.01)
*G02B 6/42* (2006.01)

(52) U.S. Cl.
CPC ......... *H01R 13/659* (2013.01); *G02B 6/4269* (2013.01); *G02B 6/4277* (2013.01); *G02B 6/4284* (2013.01); *H01R 13/665* (2013.01)

(58) Field of Classification Search
CPC ............ H01R 13/659; H01R 13/65802; H01R 13/6587; H01R 13/665; H01R 13/514; H01R 13/6582; H01R 13/648; H01R 13/6658; H01R 12/724; G02B 6/4277; G02B 6/0001; G02B 6/4269; G02B 6/4284
USPC .......................................................... 439/296
See application file for complete search history.

(56) References Cited

U.S. PATENT DOCUMENTS

| 7,249,966 | B2 * | 7/2007 | Long ................ H01R 13/65802 439/490 |
| 7,641,515 | B1 | 1/2010 | Szczesny et al. |
| 8,277,252 | B2 * | 10/2012 | Fogg .................. H01R 13/6587 439/607.25 |
| 8,870,595 | B2 * | 10/2014 | Schmitt .............. H01R 13/6587 439/607.25 |
| 9,077,120 | B2 * | 7/2015 | Zhang ................ H01R 13/6658 |
| 2005/0255726 | A1 | 11/2005 | Long |
| 2007/0270031 | A1 * | 11/2007 | Long .................... G02B 6/0001 439/541.5 |

(Continued)

OTHER PUBLICATIONS

European Search Report, European Application No. 16189326.8, International Filing Date Feb. 27, 2017.

*Primary Examiner* — Jean F Duverne

(57) ABSTRACT

An electrical connector assembly includes a cage member having walls defining an upper port and a lower port configured to receive pluggable modules therein through a front end of the cage member. The cage member houses a communication connector at a rear of the cage member configured to be electrically connected to the pluggable modules received in the upper and lower ports. The walls are manufactured from a conductive material and providing electrical shielding for the pluggable modules. The plurality of walls include side walls, a top wall between the side walls, a bottom wall between the side walls and a divider wall between the side walls. The divider wall separates the upper port from the lower port. The divider wall is positioned closer to the top wall than the bottom wall such that the lower port is taller than the upper port.

20 Claims, 3 Drawing Sheets

(56) References Cited

U.S. PATENT DOCUMENTS

| | | | | |
|---|---|---|---|---|
| 2011/0028030 A1* | 2/2011 | Chang | ............... | H01R 12/724 |
| | | | | 439/492 |
| 2012/0196458 A1* | 8/2012 | Zhang | ............... | H01R 13/514 |
| | | | | 439/95 |
| 2014/0335726 A1* | 11/2014 | Zhang | ............... | H01R 13/6582 |
| | | | | 439/607.01 |
| 2014/0349519 A1* | 11/2014 | Gao | ............... | H01R 13/648 |
| | | | | 439/607.01 |
| 2015/0244108 A1 | 8/2015 | Phillips | | |

* cited by examiner

STACKED CAGE HAVING DIFFERENT SIZE PORTS

BACKGROUND OF THE INVENTION

The subject matter herein relates generally to electrical connector assemblies for high speed optical and electrical communication systems.

It is known to provide a metal cage with a plurality of ports, whereby transceiver modules are pluggable therein. Several pluggable module designs and standards have been introduced in which a pluggable module plugs into a receptacle which is electronically connected to a host circuit board. For example, a well-known type of transceiver developed by an industry consortium is known as a gigabit interface converter (GBIC) or serial optical converter (SOC) and provides an interface between a computer and a data communication network such as Ethernet or a fiber network. These standards offer a generally robust design which has been well received in industry.

It is desirable to increase the operating frequency of the network connections. Electrical connector systems that are used at increased operating speeds present a number of design problems, particularly in applications in which data transmission rates are high, for example, in the range above 10 Gbps (Gigabits/second). One concern with such systems is reducing electromagnetic interference (EMI) emissions. Another concern is reducing operating temperatures of the transceivers.

In conventional designs, thermal cooling is achieved by using a heat sink and/or airflow over the outside of the shielding metal cage surrounding the receptacles. However, the thermal cooling provided by conventional designs is proving to be inadequate, particularly for the pluggable modules in the lower port, which tend to have less cage wall surface area exposed to airflow for cooling. Some cage designs allow airflow within the metal cage; however the various components within the cage, such as the receptacle connector, block or restrict airflow.

A need remains for an electrical connector assembly having improved thermal cooling compared to known assemblies.

BRIEF DESCRIPTION OF THE INVENTION

In one embodiment, an electrical connector assembly is provided including a cage member having a plurality of walls defining an upper port and a lower port configured to receive pluggable modules therein through a front end of the cage member. The cage member houses a communication connector at a rear of the cage member configured to be electrically connected to the pluggable modules received in the upper and lower ports. The walls are manufactured from a conductive material and providing electrical shielding for the pluggable modules. The plurality of walls include side walls, a top wall between the side walls, a bottom wall between the side walls and a divider wall between the side walls. The divider wall separates the upper port from the lower port. The divider wall is positioned closer to the top wall than the bottom wall such that the lower port is taller than the upper port.

In another embodiment, an electrical connector assembly is provided including a cage member having a plurality of walls including side walls, a top wall between the side walls, a bottom wall between the side walls and a divider wall between the side walls. The cage member defines an upper port bounded by the top wall, the side walls and the divider wall at a bottom of the upper port. The upper port is configured to receive a pluggable module therein through a front end of the cage member. The upper port is sized such that the pluggable module substantially fills the upper port between the top wall and the divider wall. The cage member defines a lower port bounded by the bottom wall, the side walls and the divider wall at a top of the lower port. The lower port is configured to receive a pluggable module therein through the front end of the cage member. The lower port is sized such that the pluggable module does not fill the lower port between the bottom wall and the divider wall. A gap is defined between the pluggable module and the divider wall to allow airflow through the lower port over the pluggable module in the lower port.

In a further embodiment, an electrical connector assembly is provided including a cage member having a plurality of walls defining an upper port and a lower port at a front end of the cage member. The plurality of walls include side walls, a top wall between the side walls, a bottom wall between the side walls and a divider wall between the side walls separating the upper port from the lower port. The walls are manufactured from a conductive material and providing electrical shielding. Pluggable modules are received in the upper port and the lower port. Each pluggable module has a circuit card held in a shell. Each pluggable module has heat dissipation fins extending from a top of the shell that extend longitudinally at least partially between a mating end and an opposite end of the shell. A communication connector is disposed within the cage member at the rear end and positioned to mate with the pluggable modules when the pluggable modules are inserted into the upper and lower ports. The upper port defines an upper airflow channel aligned with the fins of the pluggable module received in the upper port and the lower port defines a lower airflow channel aligned with the fins of the pluggable module received in the lower port. The divider wall is elevated above the fins of the pluggable module received in the lower port to define a lower airflow channel extension above the lower airflow channel to allow a greater amount of airflow through the lower port than the upper port.

DETAILED DESCRIPTION OF THE INVENTION

Figure 1:
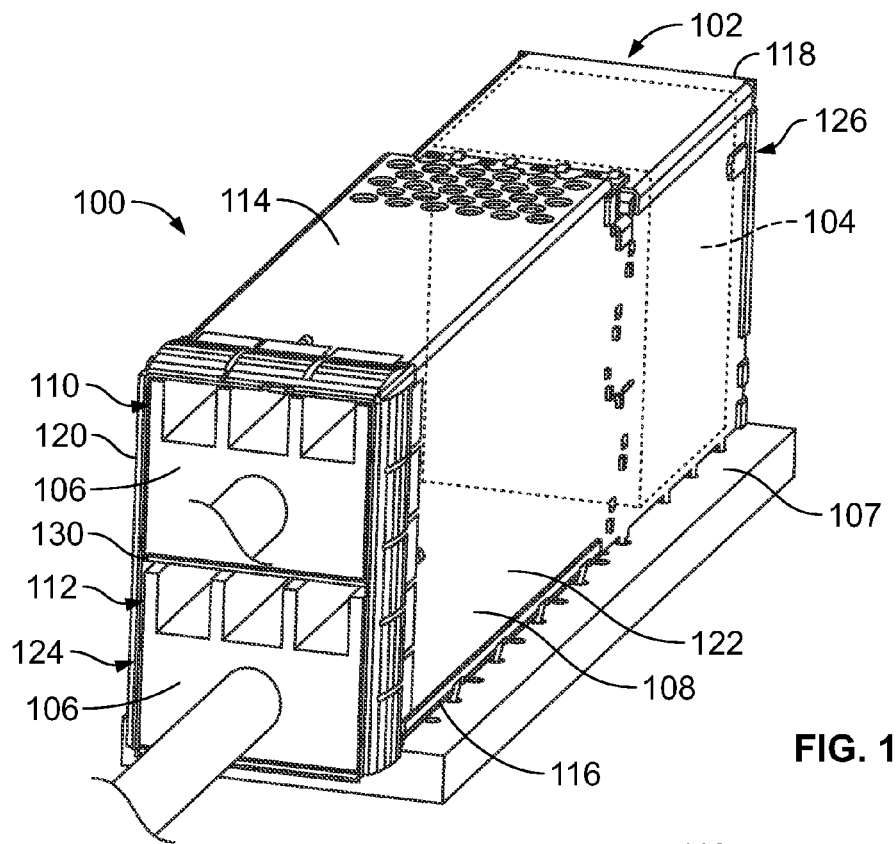
FIG. 1 is a front perspective view of an electrical connector assembly formed in accordance with an exemplary embodiment showing pluggable modules loaded into a cage member.
Figure 2:
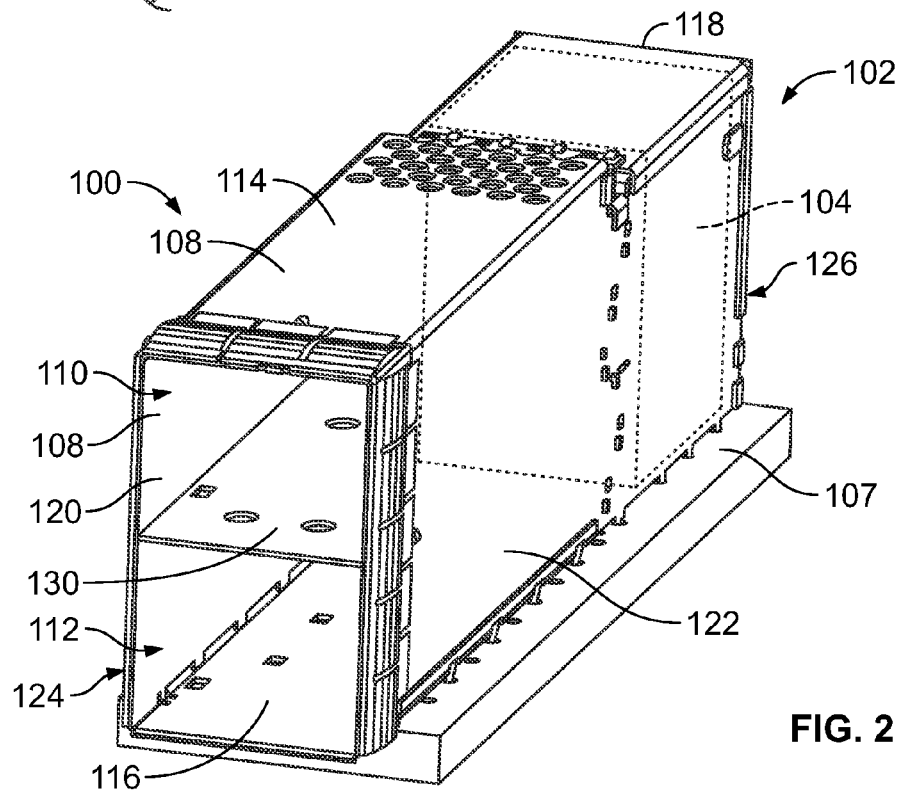
FIG. 2 is a front perspective view of the electrical connector assembly without the pluggable modules.

FIG. 1 is a front perspective view of an electrical connector assembly 100 formed in accordance with an exemplary embodiment showing pluggable modules 106 loaded into a cage member 102. FIG. 2 is a front perspective view of the electrical connector assembly 100 without the pluggable modules 106. The electrical connector assembly 100 includes the cage member 102 and a communication connector 104 (shown schematically in FIGS. 1 and 2, also illustrated in FIG. 3) received in the cage member 102. The pluggable modules 106 are configured to be loaded into the cage member 102 for mating with the communication connector 104. The cage member 102 and communication connector 104 are intended for placement on and electrical connection to a circuit board 107, such as a motherboard. The communication connector 104 is arranged within the cage member 102 for mating engagement with the pluggable modules 106.

The cage member 102 is a shielding, stamped and formed cage member that includes a plurality of shielding walls 108 that define multiple ports 110, 112 for receipt of the pluggable modules 106. In the illustrated embodiment, the cage member 102 constitutes a stacked cage member having the ports 110, 112 in a stacked configuration. The port 110 defines an upper port positioned above the port 112 and may be referred to hereinafter as upper port 110. The port 112 defines a lower port positioned below the port 110 and may be referred to hereinafter as lower port 112. Any number of ports may be provided in alternative embodiments. In the illustrated embodiment, the cage member 102 includes the ports 110, 112 arranged in a single column, however, the cage member 102 may include multiple columns of ports 110, 112 in alternative embodiments (for example, 2×2, 3×2, 4×2, 4×3, etc.).

The cage member 102 includes a top wall 114, a bottom wall 116, a rear wall 118 and side walls 120, 122, which together define the general enclosure or outer perimeter for the cage member 102. When ganged in multiple columns of ports 110, 112, at least some of the walls 108 may be interior divider walls defining side walls 120 or 122 for two different columns of ports 110, 112. Optionally, the top wall 114 may be non-planar and may be stepped downward at the rear, such as above the communication connector 104 (for example, rearward of the pluggable module 106), to improve airflow through the cage member 102.

The cage member 102 extends between a front end 124 and a rear end 126. The communication connector 104 may be positioned at or near the rear end 126 of the cage member 102. The pluggable modules 106 are configured to be loaded into the ports 110, 112 through the front end 124. Optionally, at least a portion of the bottom wall 116 may be open to allow the communication connector 104 to interface with the circuit board 107.

In an exemplary embodiment, the walls 108 may include a plurality of airflow openings or channels to allow airflow therethrough, such as from front to back, back to front and/or side to side. The airflow openings help cool the walls 108, the ports 110, 112 and/or the pluggable modules 106. The airflow openings may have any size and shape. In an exemplary embodiment, the size, shape, spacing and/or positioning of the airflow openings may be selected with consideration to thermal performance, shielding performance (for example electromagnetic interference (EMI) shielding), electrical performance, or other design considerations. Optionally, the stepped portion of the top wall 114 may include airflow openings.

The cage member 102 is subdivided by one or more divider walls 130. In the illustrated embodiment, the divider wall 130 extends horizontally between the side walls 120, 122. The divider wall 130 separates the upper port 110 from the lower port 112. In some embodiments, the divider wall 130 may be a single, planar wall. Alternatively, the divider wall 130 may be U-shaped having two parallel walls with a joining wall therebetween at the front end 124 and having a channel between the two parallel walls, such channel allowing airflow between the upper and lower ports 110, 112 and/or for routing light pipes or other components.

In an exemplary embodiment, the divider wall 130 is positioned closer to the top wall 114 than the bottom wall 116 such that the lower port 112 is taller than the upper port 110. As such, the lower port 112 allows more airflow therethrough than the upper port 110 for cooling the pluggable module 106 in the lower port 112. For example, because the upper port 110 has more exterior wall surface area for heat dissipation (for example, the top wall 114 is exposed to the exterior environment for cooling or dissipating heat into the ambient environment), the upper port 110 is naturally cooler than the lower port 112. To provide greater cooling to the lower port 112, the lower port 112 has a greater cross-sectional area than the upper port 110 (for example, height×width), and thus has a greater volume than the upper port 110 to increase the amount of cooling airflow through the lower port 112 as compared to the upper port 110.

Figure 3:
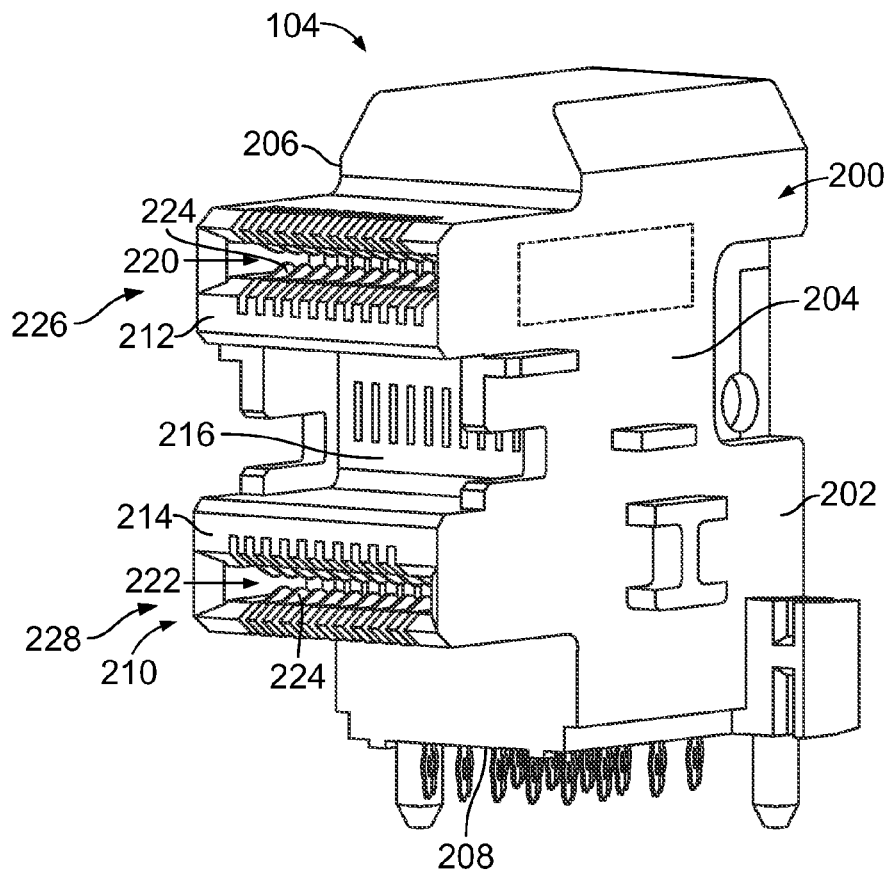
FIG. 3 is a front perspective view of a communication connector of the electrical connector assembly.

FIG. 3 is a front perspective view of the communication connector 104 in accordance with an exemplary embodiment. The communication connector 104 includes a housing 200 defined by an upstanding body portion 202 having sides 204, 206, a lower face 208 configured to be mounted to the circuit board 107 (shown in FIG. 1), and a mating face 210. Upper and lower extension portions 212 and 214 extend from the body portion 202 to define a stepped mating face 210. A recessed face 216 is defined between the upper and lower extension portions 212, 214 at the mating face 210 of the body portion 202.

Circuit card receiving slots 220 and 222 extend inwardly from the mating face 210 of each of the respective upper and lower extension portions 212, 214, and extend inwardly to the body portion 202. The circuit card receiving slots 220, 222 are configured to receive card edges of circuit cards of the corresponding pluggable modules 106 (shown in FIG. 4). A plurality of contacts 224 are held by the housing 200 and are exposed within the circuit card receiving slots 220, 222 for mating with the corresponding pluggable module 106. The contacts 224 and circuit card receiving slots 220, 222 define first and second mating interfaces 226, 228, respectively, of the communication connector 104.

The contacts 224 extend from the lower face 208 for termination to the circuit board 107. For example, the ends of the contacts 224 may constitute pins that are loaded into plated vias of the motherboard. Alternatively, the contacts 224 may be terminated to the circuit board 107 in another manner, such as by surface mounting to the circuit board 107.

Other types of communication connectors may be provided in alternative embodiments. For example, the communication connector may have a different mating interface. The housing may be shaped differently. The communication connector may have different types of contacts. For example, the communication connector may have contacts configured to mate with another type of pluggable module, such as a pluggable module that does not include a circuit card. Optionally, the communication connector may include multiple communication connector members that are stacked, with each communication connector member having a single mating interface and separately mountable to the circuit board.

Figure 4:
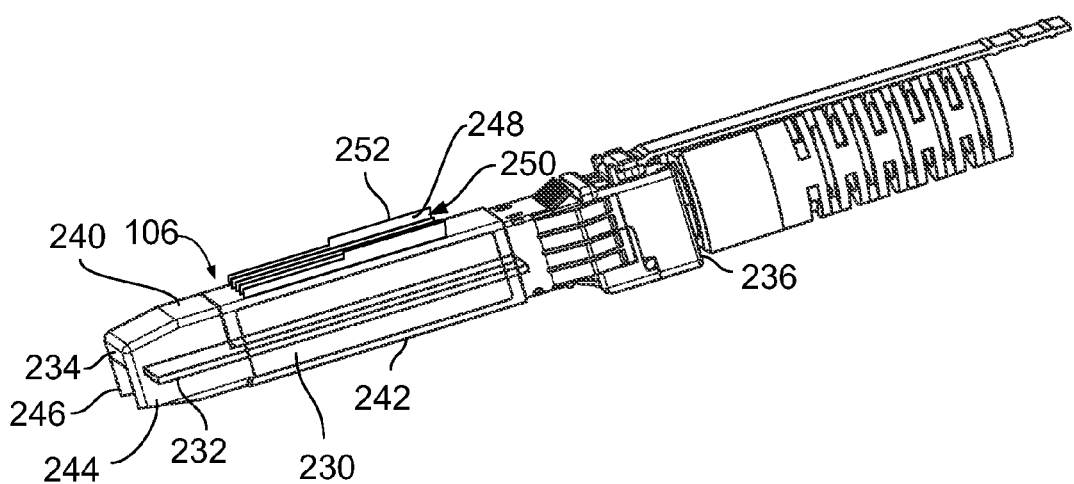
FIG. 4 illustrates an exemplary embodiment of one of the pluggable modules shown in FIG. 1.

FIG. 4 illustrates an exemplary embodiment of the pluggable module 106 for use with electrical connector assembly 100 (shown in FIG. 1). In the illustrated embodiment, the pluggable module 106 constitutes a small form-factor pluggable (SFP) module; however other types of pluggable modules or transceivers may be used in alternative embodiments. The pluggable module 106 includes a metal body or shell 230 holding a circuit card 232 at a mating end 234 thereof for interconnection into one of the slots 220 or 222 (shown in FIG. 3) of the communication connector 104 (shown in FIG. 3). The pluggable module 106 includes an electrical interconnection within the module to an interface at end 236, such as a copper interface in the way of a modular jack, or to a fiber optic connector for further interfacing. Optionally, a cable, such as an electrical cable or an optical cable, may extend from the end 236 and be terminated inside the shell 230, such as directly to the circuit card 232 or to a connector mounted to the circuit card 232.

The shell 230 has a top 240, a bottom 242 and sides 244, 246 between the top 240 and the bottom 242. Optionally, the pluggable module 106 may include thermal interface features 248 configured to provide a thermal interface with the cage member 102 (shown in FIG. 1), such as for direct thermal contact or communication with the cage member 102. In the illustrated embodiment, the thermal interface features 248 are heat dissipation fins and may be referred to hereinafter as heat dissipation fins 248. The heat dissipation fins 248 may extend from any portion of the shell 230, such as the top 240, the bottom 242 and/or the sides 244. In an exemplary embodiment, the shell 230 is thermally conductive, such as a metal material, and the heat dissipation fins 248 dissipate heat from the shell 230. The heat dissipation fins 248 extend longitudinally at least partially between the mating end 234 and the opposite end 236 of the shell 230. The heat dissipation fins 248 have channels 250 between the heat dissipation fins 248 that allow airflow along the shell 230 and the heat dissipation fins 248, which cools the pluggable module 106. The heat dissipation fins 248 have outer edges 252. The outer edges 252 may be configured to engage portions of the cage member 102 when loaded therein. In alternative embodiments, the pluggable module 106 may not include heat dissipation fins.

The pluggable module may include a latching feature for securing the pluggable module 106 in the cage member 102. The latching feature may be releasable for extraction of the pluggable module 106. Other types of pluggable modules or transceivers may be utilized in alternative embodiments.

Figure 5:
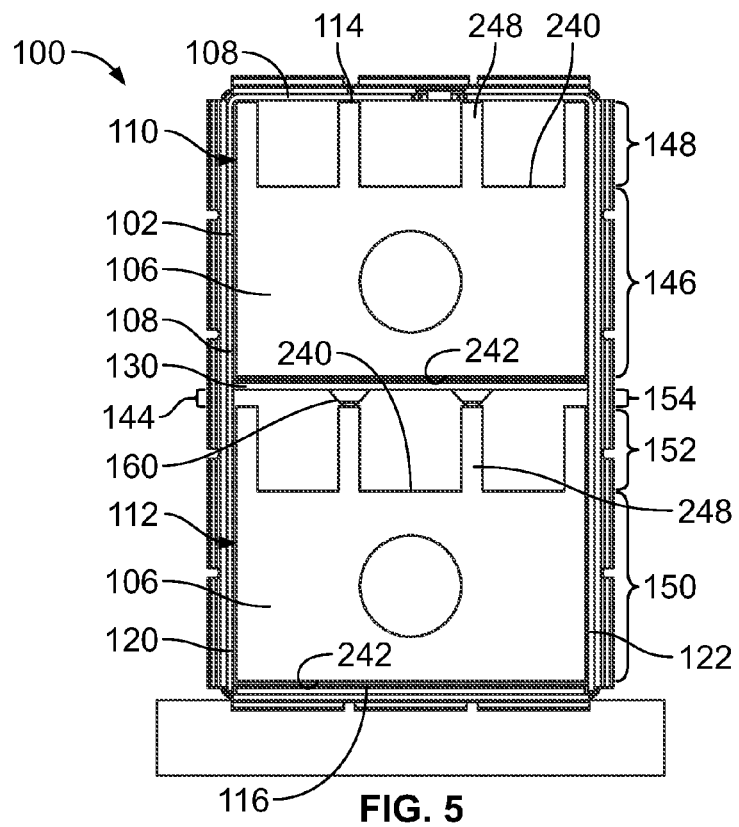
FIG. 5 is a front view of the electrical connector assembly showing the pluggable modules loaded in the cage member.
Figure 6:
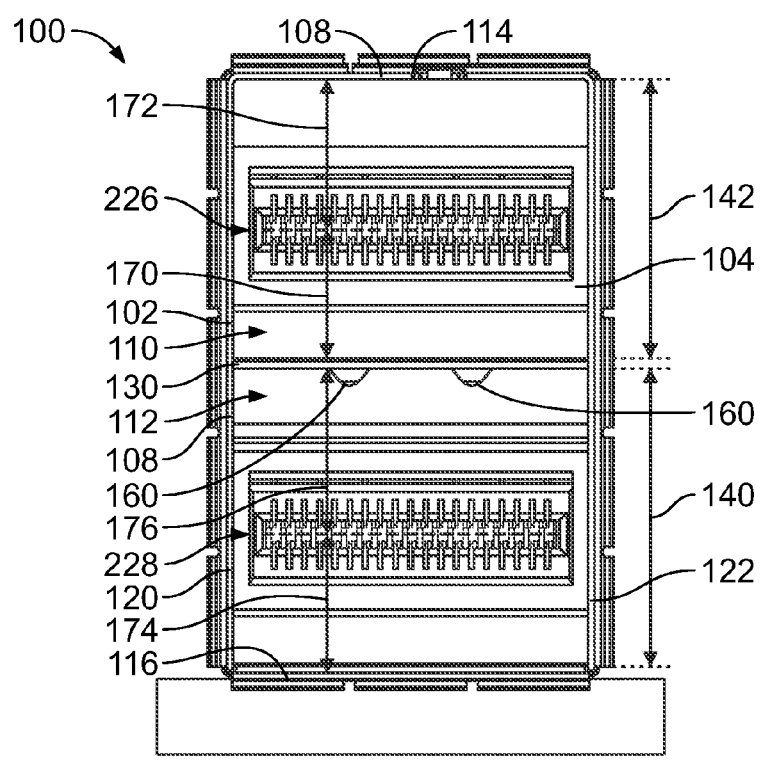
FIG. 6 is a front view of the electrical connector assembly with the pluggable modules removed to illustrate the cage member and the communication connector.

FIG. 5 is a front view of the electrical connector assembly 100 showing the pluggable modules 106 loaded in the cage member 102. FIG. 6 is a front view of the electrical connector assembly 100 with the pluggable modules 106 removed to illustrate the cage member 102 and the communication connector 104. As noted above, the lower port 112 is taller than the upper port 110 to allow greater airflow than the upper port 110 for cooling the pluggable module 106 in the lower port 112. For example, the divider wall 130 is positioned a first distance 140 (shown in FIG. 6) from the bottom wall 116 and a second distance 142 (shown in FIG. 6) from the top wall 114. The first distance 140 is greater than the second distance 142. As such, the lower port 112 defines a gap 144 (shown in FIG. 5) above the lower pluggable module 106 to allow airflow above such pluggable module 106.

The gap 144 allows airflow through the lower port 112. While both ports 110, 112 allow airflow therethrough, the lower port 112, with the addition of the gap 144, allows a greater amount of airflow for additional cooling of the lower pluggable module 106. In an exemplary embodiment, the upper port 110 includes an upper module channel 146 (shown in FIG. 5) that receives the pluggable module 106 and an upper airflow channel 148 (shown in FIG. 5) above the upper module channel 146. The heat dissipation fins 248 are located in the upper airflow channel 148. The upper airflow channel 148 allows airflow through the upper port 110, such as along and through the open area between the heat dissipation fins 248. The upper airflow channel 148 is positioned between the pluggable module 106, such as above the top 240, and the top wall 114.

The lower port 112 includes a lower module channel 150 (shown in FIG. 5) that receives the pluggable module 106, a lower airflow channel 152 (shown in FIG. 5) above the lower module channel 150, and a lower airflow channel extension 154 (shown in FIG. 5) above the lower airflow channel 152. The lower airflow channel extension 154 is defined by the gap 144. The heat dissipation fins 248 are located in the lower airflow channel 152. The lower airflow channel 152 allows airflow through the lower port 112, such as along and through the open area between the heat dissipation fins 248. The lower airflow channel 152 is positioned between the pluggable module 106, such as above the top 240, and the divider wall 130. The lower airflow channel extension 154 is located between the lower airflow channel 152 and the divider wall 130. The lower airflow channel extension 154 is located above the heat dissipation fins 248 and provides an area of increased airflow through the lower port 112 for moving a greater amount of airflow through the lower port 112 than the upper port 110, which is devoid of a channel extension.

The upper pluggable module 106 is loaded into the upper port 110 such that the heat dissipation fins 248 engage the top wall 114 to locate the pluggable module 106 in the upper port 110 (for example, to align the mating end 234 (shown in FIG. 4) with the first mating interface 226). Additionally or alternatively, the bottom 242 of the pluggable module 106 may engage the divider wall 130 to align the mating end 234 with the first mating interface 226. The walls 108 have a tight tolerance to locate the pluggable module 106 within the upper port 110 for mating with the communication connector 104. The upper port 110 is sized such that the corresponding pluggable module 106 substantially fills the upper port 110 between the top wall 114 and the divider wall 130.

In an exemplary embodiment, the lower port 112 includes alignment features 160 extending from at least one of the walls 108 to align the lower pluggable module 106 in the lower port 112. For example, in the illustrated embodiment, the alignment features 160 extend downward from the divider wall 130 into the gap 144 and the lower airflow channel extension 154. The alignment features 160 are configured to engage corresponding heat dissipation fins 248. For example, the lower pluggable module 106 is loaded into the lower port 112 such that the heat dissipation fins 248 engage the alignment features 160 to locate the pluggable module 106 in the lower port 112 for mating with the communication connector 104 at the second mating interface 228. In other various embodiments, the alignment features 160 may extend from the side walls 120, 122 to engage the heat dissipation fins 248 or the top 240 of the pluggable module 106. Additionally or alternatively, the bottom 242 of the pluggable module 106 may engage the bottom wall 116 to align the mating end 234 with the second mating interface 228. The walls 108 have a tight tolerance to locate the pluggable module 106 within the lower port 112 for mating with the communication connector 104. The lower port 112 is sized such that the corresponding pluggable module 106 does not fill the lower port 112 between the bottom wall 116 and the divider wall 130. Rather, the gap 144 is formed between the pluggable module 106 and the divider wall 130 to allow airflow through the lower port 112 over the pluggable module 106.

In an exemplary embodiment, the first and second mating interfaces 226, 228 are located at different relative positions with respect to the upper and lower ports 110, 112, respectively. For example, the first mating interface 226 is positioned at a first distance 170 (shown in FIG. 6) from the divider wall 130 and a second distance 172 (shown in FIG. 6) from the top wall 114, while the second mating interface 228 is positioned a third distance 174 (shown in FIG. 6) from the bottom wall 116 and a fourth distance 176 (shown in FIG. 6) from the divider wall 130. The first and third distances 170, 174 may be equal while the fourth distance 176 is greater than the second distance 172. As such, the top 240 of the pluggable module 106 in the lower port 112 is held a further distance from the divider wall 130 (i.e., the top wall of the lower port 112) than the top 240 of the pluggable module 106 in the upper port 112 is located from the top wall 114. As such, a larger space is provided above the pluggable module 106 in the lower port 112 than in the upper port 110 for more airflow, and thus cooling, in the lower port 112 than in the upper port 110.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112(f), unless and until such claim limitations expressly use the phrase "means for" followed by a statement of function void of further structure.

What is claimed is:

1. An electrical connector assembly comprising:
a cage member having a plurality of walls defining an upper port and a lower port configured to receive identical pluggable modules therein through a front end of the cage member, the cage member housing a communication connector at a rear of the cage member configured to be electrically connected to the pluggable modules received in the upper and lower ports, the walls being manufactured from a conductive material and providing electrical shielding for the pluggable modules;
the plurality of walls comprising side walls, a top wall between the side walls, a bottom wall between the side walls and a divider wall between the side walls, the divider wall separating the upper port from the lower port, the divider wall being positioned closer to the top wall than the bottom wall such that the lower port is taller than the upper port.

2. The electrical connector assembly of claim 1, wherein the lower port allows more airflow therethrough than the upper port.

3. The electrical connector assembly of claim 1, wherein the divider wall is positioned a first distance from the bottom wall and a second distance from the top wall, the first distance being greater than the second distance.

4. The electrical connector assembly of claim 1, wherein the lower port has a greater volume than the upper port.

5. The electrical connector assembly of claim 1, wherein the lower port has a greater cross-sectional area than the upper port.

6. The electrical connector assembly of claim 1, wherein the lower port defines a gap above the pluggable module received in the lower port to allow airflow above the pluggable module received in the lower port.

7. The electrical connector assembly of claim 1, wherein the upper port includes an upper airflow channel positioned between the pluggable module and the top wall, the lower port includes a lower airflow channel positioned between the pluggable module and the divider wall, and the lower port includes a lower airflow channel extension between the lower airflow channel and the divider wall.

8. The electrical connector assembly of claim 7, wherein the lower airflow channel and the lower airflow channel extension allow greater airflow through the lower port than the upper airflow channel allows in the upper port.

9. The electrical connector assembly of claim 1, wherein the lower port includes alignment features extending from at least one of the walls to align the pluggable module in the lower port.

10. The electrical connector assembly of claim 1, wherein the communication connector includes a first mating interface in the upper port and a second mating interface in the lower port, the first mating interface being positioned at a first distance from the divider wall and a second distance from the top wall, the second mating interface being positioned a third distance from the bottom wall and a fourth distance from the divider wall, the first and third distances being equal, the fourth distance being greater than the second distance.

11. The electrical connector assembly of claim 1, wherein the upper port is sized such that the corresponding pluggable module substantially fills the upper port between the top wall and the divider wall and the lower port is sized such that the corresponding pluggable module does not fill the lower port between the bottom wall and the divider wall, a gap being defined between the pluggable module received in the lower port and the divider wall to allow airflow through the lower port over the pluggable module received in the lower port.

12. An electrical connector assembly comprising:
a cage member having a plurality of walls including side walls, a top wall between the side walls, a bottom wall between the side walls and a divider wall between the side walls;
the cage member defining an upper port bounded by the top wall, the side walls and the divider wall at a bottom of the upper port, the upper port configured to receive a pluggable module therein through a front end of the cage member, the upper port being sized such that the pluggable module substantially fills the upper port between the top wall and the divider wall;

the cage member defining a lower port bounded by the bottom wall, the side walls and the divider wall at a top of the lower port, the lower port configured to receive a pluggable module therein through the front end of the cage member, the lower port being sized such that the pluggable module does not fill the lower port between the bottom wall and the divider wall, a gap being defined between the pluggable module and the divider wall to allow airflow through the lower port over the pluggable module in the lower port.

13. The electrical connector assembly of claim 12, wherein the lower port allows more airflow therethrough than the upper port.

14. The electrical connector assembly of claim 12, wherein the divider wall is positioned a first distance from the bottom wall and a second distance from the top wall, the first distance being greater than the second distance.

15. The electrical connector assembly of claim 12, wherein the lower port has a greater volume than the upper port.

16. The electrical connector assembly of claim 12, wherein the upper port includes an upper airflow channel positioned between the pluggable module and the top wall, the lower port including a lower airflow channel positioned between the pluggable module and the divider wall, the gap in the lower port defining a lower airflow channel extension between the lower airflow channel and the divider wall.

17. The electrical connector assembly of claim 12, wherein the communication connector includes a first mating interface in the upper port and a second mating interface in the lower port, the first mating interface being positioned at a first distance from the divider wall and a second distance from the top wall, the second mating interface being positioned a third distance from the bottom wall and a fourth distance from the divider wall, the first and third distances being equal, the fourth distance being greater than the second distance.

18. An electrical connector assembly comprising:
a cage member having a plurality of walls defining an upper port and a lower port at a front end of the cage member, the plurality of walls including side walls, a top wall between the side walls, a bottom wall between the side walls and a divider wall between the side walls separating the upper port from the lower port, the walls being manufactured from a conductive material and providing electrical shielding;
pluggable modules received in the upper port and the lower port, each pluggable module having a circuit card held in a shell, each pluggable module having heat dissipation fins extending from a top of the shell, the fins extending longitudinally at least partially between a mating end and an opposite end of the shell; and
a communication connector disposed within the cage member and positioned to mate with the pluggable modules when the pluggable modules are inserted into the upper and lower ports;
wherein the upper port defines an upper airflow channel aligned with the fins of the pluggable module received in the upper port and the lower port defines a lower airflow channel aligned with the fins of the pluggable module received in the lower port; and
wherein the divider wall is elevated above the fins of the pluggable module received in the lower port to define a lower airflow channel extension above the lower airflow channel to allow a greater amount of airflow through the lower port than the upper port.

19. The electrical connector assembly of claim 18, wherein the divider wall is positioned a first distance from the bottom wall and a second distance from the top wall, the first distance being greater than the second distance.

20. The electrical connector assembly of claim 18, wherein the communication connector includes a first mating interface in the upper port and a second mating interface in the lower port, the first mating interface being positioned at a first distance from the divider wall and a second distance from the top wall, the second mating interface being positioned a third distance from the bottom wall and a fourth distance from the divider wall, the first and third distances being equal, the fourth distance being greater than the second distance.

\* \* \* \* \*